United States Patent [19]

Newman

[11] 4,053,418
[45] Oct. 11, 1977

[54] EMBOSSED MEMBRANE SUPPORT

[75] Inventor: Ferris E. Newman, Wauconda, Ill.

[73] Assignee: Baxter Travenol Laboratories, Inc., Deerfield, Ill.

[21] Appl. No.: 620,612

[22] Filed: Oct. 8, 1975

[51] Int. Cl.² ............................................. B01D 31/00
[52] U.S. Cl. ........................... 210/321 B; 210/494 M
[58] Field of Search .................... 210/321, 321 B, 494, 210/494 M

[56] References Cited

U.S. PATENT DOCUMENTS

| 3,738,813 | 6/1973 | Esmond | 210/321 B |
| 3,753,712 | 8/1973 | Janneck et al. | 210/321 B X |
| 3,963,621 | 6/1976 | Newman | 210/321 B |

FOREIGN PATENT DOCUMENTS

| 1,037,424 | 1958 | Germany | 210/494 |

Primary Examiner—Frank A. Spear, Jr.
Assistant Examiner—E. Rollins Cross
Attorney, Agent, or Firm—Paul C. Flattery; Gerald S. Geren

[57] ABSTRACT

An elongated, flexible and embossed support member is disclosed herein for use in a coil-type artificial kidney dialyzer to support an elongated, flattened and tubularly shaped semipermeable membrane. The membrane is of cellophane or a cellulose derivative and has the characteristic of stretching further in the transverse direction than in the longitudinal direction. The support member includes an imperforate fluid-impermeable web having angle ribs on one side and skip ribs on the other side for positioning and supporting the membrane within the dialyzer. The angle ribs extend angularly from one longitudinal edge of the member to the other longitudinal edge and the skip ribs are arranged in longitudinal rows, with each row including a plurality of intermittently spaced skip ribs. The skip ribs are higher than the angle ribs and both sets of ribs are of a height effective to prevent the membrane from contacting the web.

4 Claims, 3 Drawing Figures

EMBOSSED MEMBRANE SUPPORT

BACKGROUND OF THE INVENTION

This invention relates to coil-type dialyzers or membrane diffusion devices of the type used in artifical kidney systems; and more particularly, to an embossed membrane support member for use in such devices.

Coil dialyzers used in artifical kidney systems, such as the one disclosed in U.S. Pat. No. 3,743,098, include an elongated tubularly-shaped semipermeable membrane and a membrane support member which are wound together about a cylindrical core. Blood from a patient flows through the dialyzer inside the membrane and dialysis solution flows though the dialyzer in a crosswise direction. The dialysis solution flows between the windings of the membrane and support member so as to contact the membrane and receive bodily waste products from the blood.

The membrane support disclosed in U.S. Pat. No. 3,743,098 is a foraminous screen. Recently, embossed support members have been developed which include an imperforate center who having equal-height support ribs on each side of the web. The ribs engage and position the membrane in the dialyzer, as well as define flow channels between the support member and membrane for the dialysis solution.

The membrane is made from cellophane or cellulose derivative, such as sold under the trade name Cuprophan. Such materials stretch approximately three times as much in the transverse direction as in the longitudinal direction. It is believed that, when the embossed, imperforate support members are used, portions of the membrane may stretch or droop and thus contact the web between the ribs. Such contacting could block the flow channels or otherwise adversely affect the flow of dialysis solution between the web and membrane and thereby reduce the effectiveness of the dialyzer.

It is therefore an object of this invention to provide an embossed support member which is constructed to prevent the membrane from contacting the web so as to assure uniform dialysis solution flow and contact with the membrane.

The foregoing and other objects and advantages will be apparent from the following description and appended claims taken in conjunction with the accompanying drawings.

SUMMARY OF THE INVENTION

There is provided by virtue of this invention a relatively inexpensive embosssed support member which is constructed so as to prevent the membrane from contacting the web of the support member and assure uniform dialysis solution flow between the membrane and the web.

The support member includes an elongated, flexible, and fluid-impermeable web having angularly disposed support ribs on one side and longitudinally extending rows of spaced or skip support ribs on the other side. The membrane and support member are wound in a coil and the angle ribs define angularly oriented flow channels for passage of dialysis solution along one side of the membrane, and the skip ribs define sinuous transversely-oriented dialysis solution flow channels on the other side of the membrane. The height of the ribs is effective to prevent membrane contact. In th embodiment disclosed herein, the height of the skip ribs is greater than the height of the angle ribs. All of the ribs have rounded tips which permit it to gently engage the membrane and minimize damage thereto.

DESCRIPTION OF THE ILLUSTRATIVE EMBODIMENT

Figure 1:
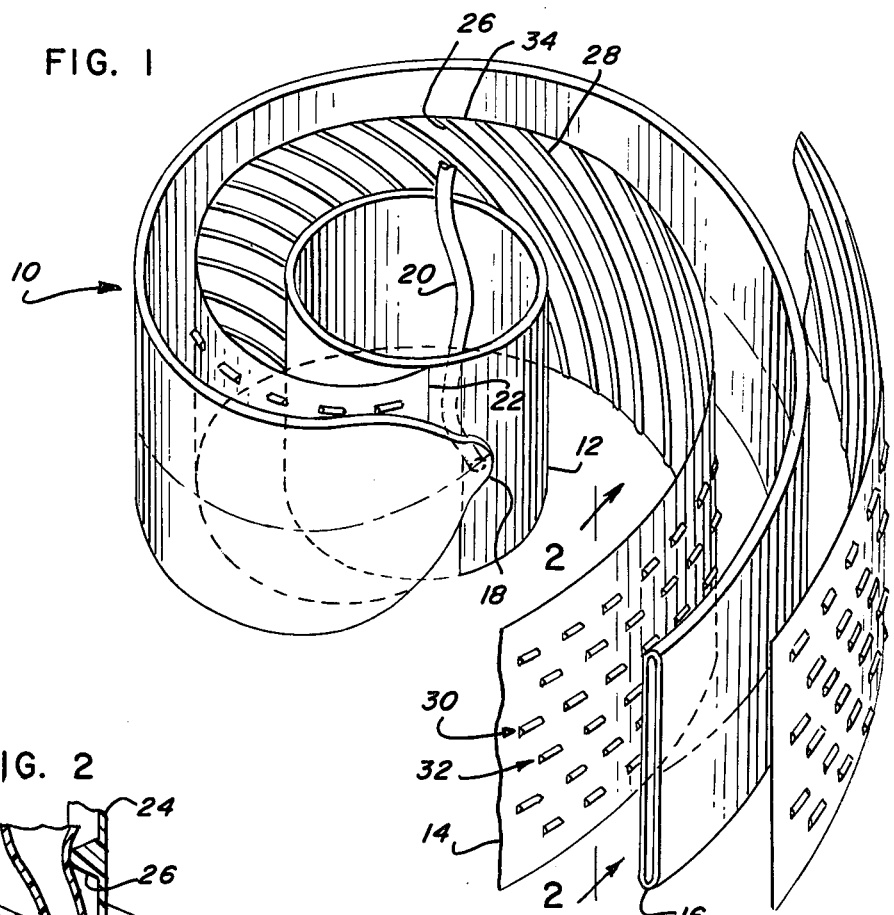
FIG. 1 is an exploded, fragmentary, perspective view of a coil dialyzer showing the tubularly-shaped semipermeable membrane and the embossed support member, wound together about the cylindrical core.
Figure 2:
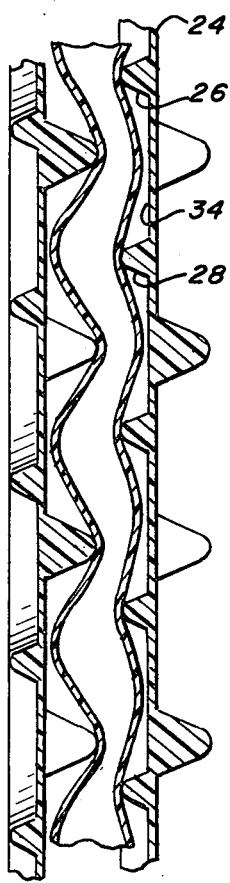
FIG. 2 is a greatly enlarged, fragmentary, cross-sectional view taken substantially along line 2—2 of FIG. 1 and showing in greater detail the manner in which the membrane is supported by the support member.
Figure 3:
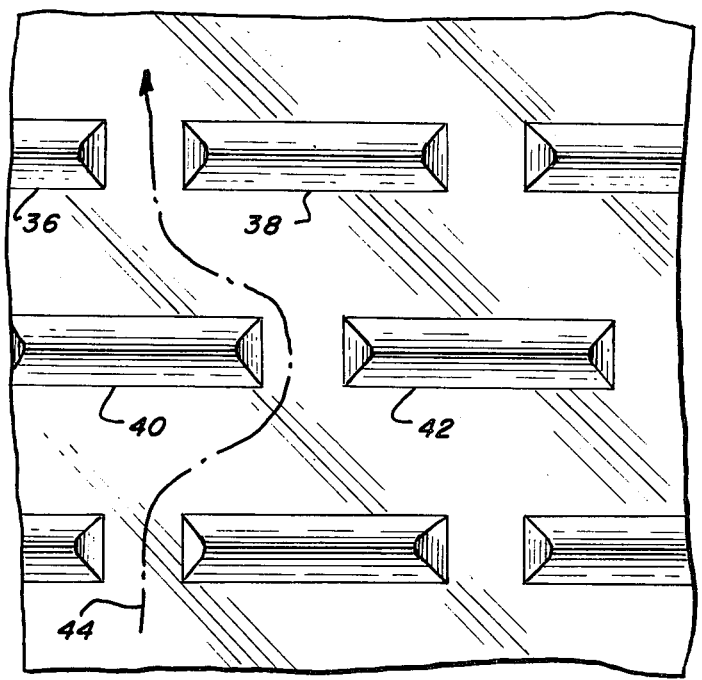
FIG. 3 is a greatly enlarged plan view of a portion of the skip rib side of the support member.

Referring to the drawings, a membrane diffusion device or coil dialyzer 10 is shown for use in an artifical kidney. The dialyzer includes a cylindrical core 12, about which is wound elongated, flexible support member 14 and a flat, expandable and tubularly-shaped semipermeable membrane 16. The support member and membrane are coiled together so that the membrane is both supported by and positioned in the dialyzer by the support member.

The membrane 16 is made of cellophane or a cellulose derivative (such as sold under the trade name Cuprophan) and serves as the conduit for blood passing through the dialyzer. Cellophane membranes have the characteristic that when they are filled with fluid, they stretch approximately three times further in the transverse direction than in the longitudinal or blood flow direction.

The inlet end 18 of the membrane is secured to the core 12, and an inlet tube 20 which carries blood from a patient, extends through the wall of the core and is connected at one end to the membrane inlet end 18. The outlet end (not shown) of the membrane is positioned radially outwardly of the core and is connected to an outlet tube (not shown) for directing treated blood back to the patient.

The membrane support member 14 is an onepiece, embossed, flexible member which is made of a material such as polypropylene or medium density polyethylene. In order to provide the appropriate support, the member is slightly longer and wider than the membrane 16. In the dialyzer, the inner end 22 of the support is secured to the core 12 and the outer end (not shown) is positioned radially outwardly of the core.

The support 14 includes a central, imperforate web 24 having a plurality of outwardly-extending angle support ribs, such as 26 and 28, on one side and a plurality of longitudinally-extending rows, such as 30 and 32, of skip support ribs on the other side.

The angle ribs 26 and 28 have rounded tips and extend from the bottom longitudinal edge of the web to the top longitudinal edge at an angle of between 45° and 60°. The ribs are generally parallel to each other, and are spaced apart a distance of between about 0.06 to 0.1 inches with 0.080 being preferred. After winding with membrane, the angle ribs assume a somewhat curved shape and cooperate with the membrane to define a plurality of dialysis solution flow channels, such as 34. In the illustrative embodiment, the angle ribs are positioned to contact and support the outwardly-facing longitudinal sidewall of the membrane 16.

The angle ribs are between about 0.010 and 0.020 inches high with 0.018 being preferred. These heights are effective to prevent the membrane from drooping between the ribs and contacting the angle rib side of the web. The continuous nature and angular orientation of the angle ribs prevent membrane-to-web contact resulting from the transverse stretch and the height of the ribs prevents the longitudinal stretch from causing contact. Thus the angle ribs prevent contact and maintain the membrane in a position spaced from the web.

Each row of the skip ribs includes a plurality of intermittently-spaced, longitudinally-oriented, triangularly shaped ribs or segments, such as 36, 38, 40 and 42. The rows are staggered so that a rib 40 in one row faces the gap between the ends of two ribs 36 and 38 in another row. The longitudinal row arrangement enhances blood flow in the longitudinal direction and the intermittent spacing and staggering in cooperation with the membrane permits the formation of vertically-oriented sinuous flow paths or channels, such as 44, through the rows. The spacing between the longitudinal rows of skip ribs is between 0.12 and 0.14 inches with 0.125 being preferred. This spacing is greater than the spacing between the angle ribs. The skip ribs are taller than the angle ribs and are between 0.028 and 0.038 inches high with a height of 0.034 inches being preferred. The skip ribs are also about 0.160 inches long and about 0.062 inches wide at the base. The distance between the ends of the skip ribs in a row is between 0.060 and 0.100 inches with .080 inches being preferred.

In the embodiment shown, the skip ribs are positioned to contact and support the inwardly-facing longitudinal wall of the membrane 16. The sidewall portion of the membrane, which is supported by the skip ribs, also experiences longitudinal and transverse stretch. The longitudinal stretch is accommodated by the length of the ribs and by the spacing between the adjacent skip ribs in the same row. On the other hand, transverse stretch can cause droop between rows of ribs, but the height of the skip ribs is effective to prevent the membrane from contacting the web. The skip ribs are taller than the angle ribs since the droop between rows of skip ribs is greater than between rows of angle ribs.

It has been found that the spacing between the rows of skip ribs must be proportionally related to the spacing between the angle ribs so as to effectively maintain substantially equal dialysis solution flow on both sides of the membrane as well as to control the blood and dialysis solution pressure.

In the embodiment shown, the height of the skip ribs is about 0.034 inches, the height of the angle ribs is about 0.018 inches, and the thickness of the web is about 0.004 inches so that the total thickness of the member is about 0.056 inches. With these heights, a clearance of about 0.005 inches is assured between the membrane and each side of the web which, in turn, assures proper dialysis solution flow. The rounded tips on both the angle and skip ribs aid in reducing damage to the membrane which might result from membrane contact with the support.

It will be appreciated that numerous changes and modifications can be made to the embodiment shown herein without departing from the spirit and scope of this invention.

What is claimed and desired to be secured by Letters Patent of the United States is:

1. An embossed and elongated flexible support member for use in a coil dialyzer for supporting an elongated, tubularly shaped, semipermeable membrane, which membrane is characterized by stretching further in the transverse direction than in the longitudinal direction, said support member comprising:
   an elongated imperforate impermeable web;
   means on one side of said web defining a plurality of angle ribs for engaging and supporting a side of said membrane and for cooperation in defining a plurality of angular flow channels;
   means on the other side of said web defining a plurality of skip ribs for engaging and supporting a side of said membrane, said ribs arranged in a plurality of longitudinally extending rows with the ribs in each row being spaced from each other and for cooperation in defining sinuous flow channels through said rows; and
   the height of said skip ribs and angle ribs being effective to prevent contact between said membrane and said web, wherein the height of said skip ribs are of a greater height than said angle ribs.

2. A member as in claim 1, wherein the height of the angle ribs is between about 0.010 and 0.020 inches and the height of the skip ribs is between about 0.028 and 0.038 inches.

3. A member as in claim 1, wherein said skip ribs and said angle ribs have rounded outwardly extending tips for engaging and supporting the semipermeable membrane.

4. A coil dialyzer comprising: a tubular shaped, semipermeable membrane having internal walls and external walls, said internal walls defining a blood flow path; a support member for supporting said membrane in said dialyzer, said support member maintaining a predetermined distance between said internal walls of the membrane, said support member defining a flow path for the dialysis solution between said member and said external walls of the membrane; and said support member including an elongated imperforate fluid-impermeable web having a first set of elongated, generally parallel, membrane engaging ribs on one side of said support member and a second set of elongated, generally parallel, membrane engaging ribs on the other side of said support member at angle to said first/set of ribs, said second set of ribs being spaced apart a distance greater than said first set of ribs; and said second set of ribs having a height uniformly greater than that of substantially all said first set of ribs to prevent contact between said external walls of the membrane and the web and to maintain substantially equal flow rate of dialysis solution on both sides of the semipermeable membrane.

* * * * *